(12) United States Patent
Schuba et al.

(10) Patent No.: US 8,356,285 B2
(45) Date of Patent: Jan. 15, 2013

(54) FACILITATED INTROSPECTION OF VIRTUALIZED ENVIRONMENTS

(75) Inventors: Christoph L. Schuba, Mountain View, CA (US); Tim P. Marsland, Half Moon Bay, CA (US)

(73) Assignee: Oracle America, Inc., Redwood Shores, CA (US)

( * ) Notice: Subject to any disclaimer, the term of this patent is extended or adjusted under 35 U.S.C. 154(b) by 960 days.

(21) Appl. No.: 12/415,801

(22) Filed: Mar. 31, 2009

(65) Prior Publication Data

US 2010/0251238 A1  Sep. 30, 2010

(51) Int. Cl.
*G06F 9/44* (2006.01)
*G06F 9/45* (2006.01)

(52) U.S. Cl. .................... 717/127; 717/128; 717/129

(58) Field of Classification Search ........... 717/124–132
See application file for complete search history.

(56) References Cited

U.S. PATENT DOCUMENTS

| | | | | |
|---|---|---|---|---|
| 5,506,792 A * | 4/1996 | Adelson et al. | ............... | 702/108 |
| 6,901,582 B1 * | 5/2005 | Harrison | ................. | 717/127 |
| 6,978,446 B2 * | 12/2005 | Archambeault et al. | ...... | 717/132 |
| 6,988,263 B1 * | 1/2006 | Hussain et al. | ............... | 717/128 |
| 7,047,521 B2 * | 5/2006 | Bunnell | .................. | 717/130 |
| 7,047,522 B1 * | 5/2006 | Dixon et al. | ................. | 717/131 |
| 7,313,564 B2 * | 12/2007 | Melamed et al. | ............ | 717/124 |
| 7,461,369 B2 * | 12/2008 | Zhao et al. | ................... | 717/131 |
| 7,464,373 B1 * | 12/2008 | Yunt et al. | ..................... | 717/125 |
| 7,490,319 B2 * | 2/2009 | Blackwell et al. | ............ | 717/124 |
| 7,546,587 B2 * | 6/2009 | Marr et al. | .................... | 717/127 |
| 7,596,778 B2 * | 9/2009 | Kolawa et al. | ................ | 717/126 |
| 7,721,260 B2 * | 5/2010 | Short et al. | .................... | 717/124 |
| 7,757,217 B2 * | 7/2010 | Sivaram | ........................ | 717/128 |
| 7,779,238 B2 * | 8/2010 | Kosche et al. | ............... | 712/227 |
| 7,797,748 B2 * | 9/2010 | Zheng et al. | ................... | 726/24 |
| 7,904,278 B2 * | 3/2011 | Wilson et al. | ................ | 702/186 |
| 7,908,590 B1 * | 3/2011 | Min et al. | ....................... | 717/124 |
| 8,024,708 B2 * | 9/2011 | Demetriou et al. | .......... | 717/124 |
| 8,042,102 B2 * | 10/2011 | DeWitt et al. | ................ | 717/128 |
| 8,166,459 B2 * | 4/2012 | Suenbuel | ..................... | 717/124 |

OTHER PUBLICATIONS

Mizuno et al, "Traiing on errors experiments to detect fault prone software modules by spam filter", ACM ESEC, pp. 405-414, 2007.*
Tamrawi et al, "Build code analysis with symbolic evaluation", IEEE, pp. 650-660, 2012.*
Daniel et al, "ReAssert: sugessting repairs for broken unit tests" IEEE, pp. 433-444, 2009.*
Dimitrov et al, "Unified architectural support for soft error protection or software bug detection", IEEE, pp. 73-82, 2007.*

\* cited by examiner

*Primary Examiner* — Anil Khatri
(74) *Attorney, Agent, or Firm* — Park, Vaughan, Fleming & Dowler LLP; Chia-Hsin Suen

(57) ABSTRACT

Some embodiments provide a system that manages the execution of a software component in a virtualized environment. During operation, the system monitors the execution of the software component from an external location to the virtualized environment. Next, the system assesses an integrity of the software component by comparing the monitored execution to an expected operation of the software component, wherein the expected operation is determined based on source code for the software component. Finally, the system uses the assessed integrity of the software component to facilitate the execution of the software component.

18 Claims, 3 Drawing Sheets

FACILITATED INTROSPECTION OF VIRTUALIZED ENVIRONMENTS

RELATED APPLICATION

The subject matter of this application is related to the subject matter in U.S. Pat. No. 8,195,980, entitled "Virtual Machine Snapshotting and Damage Containment," and filed on the same day as the instant application.

BACKGROUND

1. Field

The present embodiments relate to techniques for managing the execution of virtual machines. More specifically, the present embodiments relate to a method and system for facilitating the introspection of virtual machines.

2. Related Art

Virtualization may be used to run multiple operating system instances on a single physical machine. For example, virtualization may allow multiple types of operating systems to run within virtual machines on a single server and share the physical resources of the server. As a result, virtualization in computing systems provides a number of advantages, such as improved utilization of resources, reduction of costs, server consolidation, and/or bypassing of interoperability restraints.

However, virtualized environments may be subject to the same security and integrity risks as those of native environments. In particular, each virtual machine within a physical machine may be vulnerable to intrusion and attack from a variety of sources. Moreover, the execution of multiple types of operating systems on a single computing system may complicate the implementation of security measures for the computing system by requiring that the security measures address security vulnerabilities for each type of operating system on the computing system. As a result, attacks on virtual machines within a single physical machine may be difficult to detect, analyze, and/or manage.

Hence, what is needed is a mechanism for facilitating the detection, analysis, and management of attacks and exploits on virtual machines.

SUMMARY

Some embodiments provide a system that manages the execution of a software component in a virtualized environment. During operation, the system monitors the execution of the software component from an external location to the virtualized environment. Next, the system assesses an integrity of the software component by comparing the monitored execution to an expected operation of the software component, wherein the expected operation is determined based on source code for the software component. Finally, the system uses the assessed integrity of the software component to facilitate the execution of the software component.

In some embodiments, the system additionally monitors execution of an identical software component to the software component from the external location and further assesses the integrity of the software component by comparing the monitored execution of the software component to the additionally monitored execution of the identical software component.

In some embodiments, facilitating the execution of the software component involves at least one of validating the execution of the software component, debugging the software component, and responding to an exploit of the software component.

In some embodiments, assessing the integrity of the software component involves at least one of detecting a deviation of the monitored execution from the expected operation of the software component and determining a source of the deviation from the expected operation.

In some embodiments, the software component is closed source.

In some embodiments, the software component is at least one of an operating system and an application.

In some embodiments, the execution of the operating system is monitored through a hypervisor that executes the operating system in a virtual machine.

In some embodiments, the execution of the application is monitored through a kernel that executes the application in the virtualized environment.

DETAILED DESCRIPTION

Figure 1A:
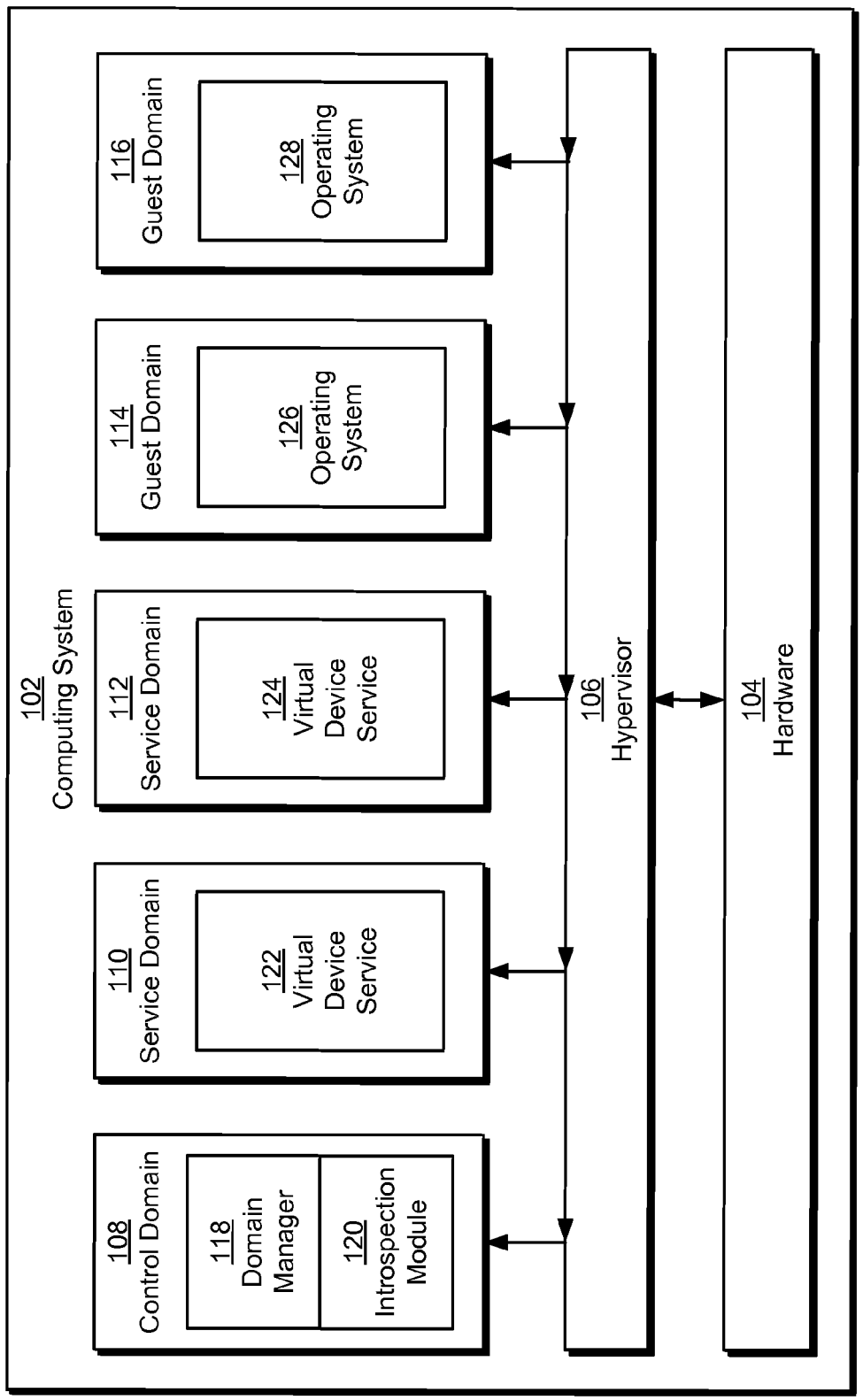
FIG. 1A shows a computing system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for managing execution of a software component in a virtualized environment. The software component may correspond to an application, operating system, and/or driver executing on a computing system. In addition, the virtualized environment may be managed by a hypervisor and/or operating system kernel on the computing system. For example, the virtualized environment may correspond to a virtual machine that executes an operating system through services provided by a hypervisor on the computing system. Alternatively, the virtualized environment may correspond to a runtime environment for an application that executes through an operating system kernel on the computing system.

More specifically, embodiments provide a method and system for facilitated introspection of the software component executing in the virtualized environment. The execution of the software component may be monitored by an introspection module in an external location to the virtualized environment. The introspection module may monitor the software component periodically, randomly, and/or upon detecting an event associated with the software component. The introspection module may also assess the integrity of the software component by comparing the monitored execution of the software component to the expected operation of the software component and/or to the monitored execution of identical software components.

In one or more embodiments, the expected operation of the software component is determined based on source code for the software component. As a result, the introspection module may bridge the semantic gap created by the virtualized environment because the introspection module includes functionality to understand low-level information observed from the software component, such as memory pages, network packets, system calls, domain ranges of variables, code modules, data structures, hardware events, and/or input/output (I/O) events.

In one or more embodiments, assessing the integrity of the software component involves detecting a deviation of the monitored execution from the expected operation of the software component and/or determining a source (e.g., exploit, bug, error, etc.) of the deviation from the expected operation. The assessed integrity of the software component may then be used to facilitate the execution of the software component. In particular, the execution of the software component may be validated or debugged by the introspection module. Furthermore, the introspection module may enable a response to an exploit of the software component.

FIG. 1A shows a computing system 102 in accordance with an embodiment. In particular, FIG. 1A shows a configuration within computing system 102 for managing the execution of one or more operating systems (e.g., operating systems 126-128) within virtualized environments. The configuration includes hardware 104, a hypervisor 106, a control domain 108, a set of service domains 110-112, and a set of guest domains 114-116. Each of these components is described in further detail below.

Computing system 102 may correspond to an electronic computing device that provides one or more services or functions to a user. For example, computing system 102 may operate as a personal computer, laptop computer, server, and/or workstation. Furthermore, the functionality of computing system 102 may be provided by the execution of software on hardware 104 components of computing system 102, such as processors, memory, input/output (I/O) devices, and/or network interface cards. For example, computing system 102 may include an operating system that coordinates the use of hardware 104 and software resources on computing system 102, as well as one or more applications that perform specialized tasks for the user.

More specifically, software such as operating systems and applications on computing system 102 may be executed within one or more virtual machines. Each virtual machine may correspond to a software-based virtualized environment for a physical machine (e.g., computing system 102) that executes on hardware 104. Each virtual machine may also be configured to execute a variety of applications, processes, and/or operating systems in isolation from other virtual machines on computing system 102. In other words, the independent execution of multiple virtual machines on a single set of hardware 104 resources may provide increased versatility, utilization of resources, and/or security to computing system 102.

In one or more embodiments, computing system 102 functions as a server, such as an application server, web server, and/or email server. As a result, computing system 102 may be configured to process incoming events from multiple users and/or provide a large variety of services to the users. To increase server-based functionality and performance, computing system 102 may execute a variety of operating system instances within the virtual machines. For example, computing system 102 may include three virtual machines respectively running Linux, Solaris (Solaris™ is a registered trademark of Sun Microsystems, Inc.), and Microsoft Windows (Microsoft Windows™ is a registered trademark of Microsoft Corp.). Applications and/or processes that are specific to an operating system may thus run on computing system 102 within the virtual machine containing the operating system. Furthermore, security exploits of one operating system may be confined to the virtual machine containing the operating system and may not affect the execution of other operating systems on other virtual machines in computing system 102.

In one or more embodiments, virtual machines on computing system 102 are executed as guest domains (e.g., guest domains 114-116). Computing system 102 may also include other domains, such as control domain 108 and service domains 110-112. Each domain may correspond to a logical grouping of software, resources, and/or identity within computing system 102 that is distinct from that of other domains. For example, each domain may include an operating system kernel, patches for the kernel, and tuning parameters for the kernel; a set of user accounts and/or administrators; a set of disks; and/or a set of network interfaces and addresses. In addition, the control and execution of domains on computing system 102 may be enabled by hypervisor 106.

Hypervisor 106 may correspond to a firmware layer on computing system 102 that operates as a hardware control for the domains. In other words, hypervisor 106 may manage the execution of the domains by controlling access to hardware 104 resources from each domain and maintaining isolation between the domains. For example, hypervisor 106 may allocate subsets of processor, memory, and/or I/O resources on computing system 102 to a given domain. Consequently, hypervisor 106 may support the simultaneous execution of multiple operating systems, each within a guest domain, on computing system 102. Alternatively, hypervisor 106 may correspond to a hosted hypervisor that runs within a native operating system on computing system 102 and obtains resources for the domains through the native operating system.

In one or more embodiments, the management of domains in computing system 102 is performed through control domain 108. More specifically, a domain manager 118 executing within control domain 108 may include functionality obtained through hypervisor 106 to create and manage domains as well as allocate resources to domains. In other words, domain manager 118 may correspond to a software component within control domain 108 that exposes the capabilities of hypervisor 106 to a user of control domain 108. Commands from the user for managing the domains may be sent through domain manager 118 to hypervisor 106, which may implement the commands by interfacing with hardware 104. For example, changes in resource allocation among domains may be obtained from a user by domain manager 118 and sent to hypervisor 106 for updating hardware 104 resource partitions associated with the domains.

Service domains 110-112 may provide virtual device services 122-124 to other domains of computing system 102. For example, service domains 110-112 may provide virtualized devices, such as virtual switches, disk servers, and/or network interface cards, to the other domains. The other domains may further interact with the virtualized devices in the same fashion as the other domains would interact with physical devices.

Those skilled in the art will appreciate that operating systems 126-128 may include security vulnerabilities. While an exploit of a security vulnerability may affect only the operating system containing the security vulnerability, such exploits may disable or adversely affect features or services that are provided by the affected operating systems. Furthermore, the exploits may be difficult to detect or analyze because of the semantic gap between virtualized environments (e.g., guest domains 114-116) within which the operating systems execute and monitoring mechanisms outside the virtualized environments.

To address security concerns related to virtual machines, the execution of virtual machines on computing system 102 may be managed using introspection techniques that allow exploits of the virtual machines to be detected and analyzed. In particular, each virtual machine may be monitored during execution for abnormal operation by an introspection module 120 in control domain 108 or another domain. Introspection module 120 may correspond to a software component that performs integrity checks on the virtual machine based on the expected underlying operation of the virtual machine. Moreover, introspection module 120 may bridge the semantic gap with the virtual machine because the operation of the introspection module is based on source code for the virtual machine.

In particular, introspection module 120 may execute in an external location to the isolated virtualized environment (e.g., guest domains 114-116) of the corresponding operating system 126-128. As a result, introspection module 120 may be unaffected by changes, exploits, and/or errors in the execution of the operating system. Furthermore, introspection module 120 may continue to execute if the corresponding operating system fails or is disabled.

In one or more embodiments, introspection module 120 assesses the integrity of the operating system by comparing the monitored execution of the operating system to the expected operation of the operating system. In one or more embodiments, the expected operation of each operating system is determined based on source code for the operating system. In other words, the expected operation of the operating system may correspond to the underlying functionality of the operating system as intended by the designer, architect, and/or engineer of the operating system. As a result, introspection module 120 may be written by a person who is familiar with the architecture and/or intended functionality of the operating system to be monitored by introspection module 120.

For example, one or more introspection modules may be written for the Microsoft Windows operating system by an architect of Microsoft Windows. The architect may both be familiar with the intended functionality and/or behavior of Microsoft Windows and may additionally have access to source code for Microsoft Windows. The architect may thus be able to produce a set of introspection modules for Microsoft Windows that accurately assess the integrity of one or more Microsoft Windows instances executing within computing system 102 from outside the Microsoft Windows instances. Furthermore, the architect may not be required to disclose the source code for Microsoft Windows in creating the introspection modules for Microsoft Windows. In other words, the architect may create introspection modules for accurately assessing the integrity of Microsoft Windows instances while maintaining the closed source nature of Microsoft Windows.

In one or more embodiments, monitoring the execution of the operating system involves monitoring low-level information such as memory pages, network packets, system calls, domain ranges of variables, code modules, data structures, hardware events, and input/output (I/O) events. Such low-level, externally observed information observed from the operating system may be understood by introspection module 120 because introspection module 120 is created by a person who is familiar with the structure and intended operation of the operating system. Consequently, introspection module 120 may bridge the semantic gap between low-level information and high-level representations of data in the operating system. Moreover, the creation of introspection module 120 by a person familiar with the intended functionality of the operating system may enable the semantic gap to be bridged even in closed source operating systems such as Microsoft Windows.

Those skilled in the art will appreciate that computing system 102 may include a number of introspection modules for monitoring one or more operating systems. For example, each introspection module may monitor one or more components of the corresponding operating system. As a result, one operating system executing within a guest domain (e.g., a virtual machine) in computing system 102 may include multiple introspection modules, each of which monitors a different area of execution within the operating system. Similarly, each instance of the operating system may be monitored by a separate set of introspection modules for the operating system, or the same set of introspection modules may be used to concurrently monitor multiple instances of the operating system executing within computing system 102. Different configurations of operating systems and introspection modules may thus allow for periodic, random, and/or event-based monitoring of each operating system.

Because the operating system may execute in a virtualized environment within computing system 102, the operating system may execute in a virtual machine in conjunction with a set of identical virtual machines. For example, operating systems 126-128 may correspond to identical instances of Microsoft Windows, Solaris, and/or Linux. Both instances may include identical configurations of applications, processes, and/or use of hardware resources on computing system 102. As a result, errors and/or changes in the operation of one operating system instance in computing system 102 may be detected by additionally monitoring the execution of identical operating system instances in computing system 102 and comparing the monitored execution of the operating system instance with that of the other operating system instances. For example, computing system 102 may include n instances of Microsoft Windows. Each instance may be identically configured and execute the same applications and/or processes. Errors and/or changes in the operation of one Microsoft Windows instance may thus be detected by comparing the monitored execution of the Microsoft Windows instance with that of the other n–1 Microsoft Windows instances. In other words, deviations in the behavior of one Microsoft Windows instance from the behavior of the other Microsoft Windows instances may indicate an error, failure, and/or exploit in the Microsoft Windows instance.

In one or more embodiments, assessing the integrity of the software component involves detecting a deviation of the monitored execution from the expected operation of the operating system and/or determining a source of the deviation from the expected operation. Detecting the deviation of the monitored execution from the expected operation may correspond to a general analysis of the operating system's correctness as determined by the monitored execution of the operating system. For example, changes in memory pages, system calls, variable domain ranges, and/or other information monitored from the operating system as compared with expected representations of such information may represent a deviation of the monitored execution from the expected operation. On the other hand, determining the source of the deviation from the expected operation may refer to a specific analysis of incorrect behavior observed from the operating system to determine a cause of the incorrect behavior. For example, changes in externally observed information from the operating system may be analyzed for patterns and/or trends that reveal the specific source of the change, such as a particular exploit, error, and/or bug that causes the change.

Finally, the assessed integrity of the operating system may be used to facilitate the execution of the operating system. In particular, the assessed integrity of the operating system may be used to validate the execution of the operating system, debug the operating system, and/or respond to an exploit of the operating system. For example, the verified integrity of the operating system may be used to validate the operating system's execution. Similarly, a lapse in the integrity of the operating system may be used to prevent the lapse from spreading to other operating systems, suspend the operating system's execution, and/or restore integrity to the operating system's execution.

In one or more embodiments, facilitating the execution of the operating system involves implementing snapshotting and damage containment techniques for the operating system. Such snapshotting and damage containment techniques may allow exploits to be contained and/or reversed in the affected operating system. Virtual machine snapshotting and damage containment is described in U.S. Pat. No. 8,195,980, entitled "Virtual Machine Snapshotting and Damage Containment," and filed on the same day as the instant application.

Figure 1B:
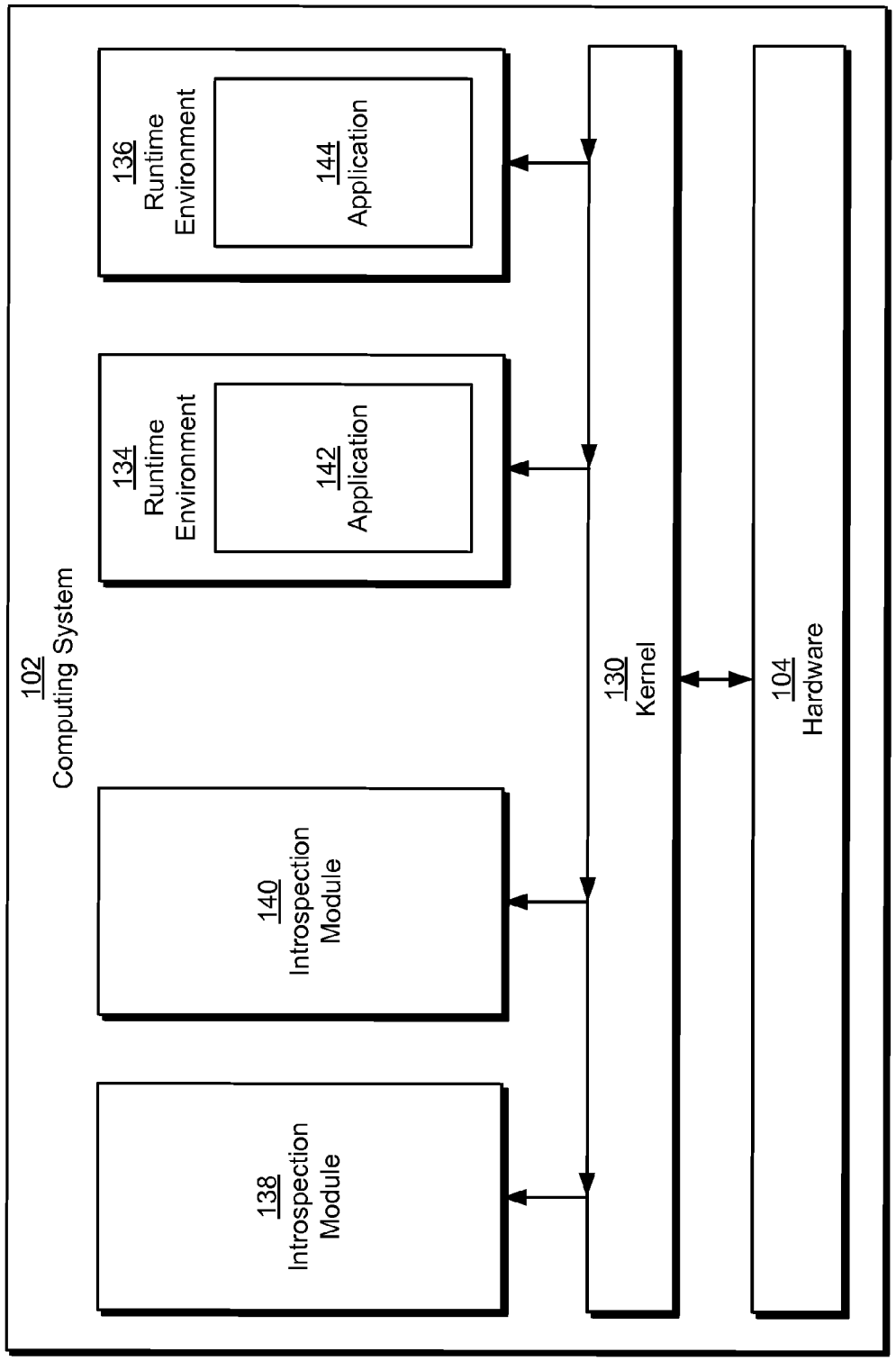
FIG. 1B shows a computing system in accordance with an embodiment.

FIG. 1B shows a computing system in accordance with an embodiment. More specifically, FIG. 1B shows a configuration within computing system 102 for managing the execution of one or more applications (e.g., applications 142-144) within virtualized runtime environments (e.g., runtime environments 134-136). The configuration includes hardware 104, a kernel 130, a set of introspection modules 138-140, and runtime environments 134-136.

In one or more embodiments, the configuration of computing system 102 in FIG. 1B is used to facilitate the introspection of applications 142-144 executing within runtime environments 134-136. Each application 142-144 may correspond to an email client, an address book, a document editor, a tax preparation application, a web browser, and/or another software component configured to perform specialized tasks for one or more users of computing system 102. To perform tasks for the user, applications 142-144 may obtain the use of hardware 104 (e.g., processor, memory, I/O components, wireless transmitter, etc.) on computing system 102 from kernel 130 (e.g., operating system kernel). Furthermore, the execution of applications 142-144 on computing system 102 may be managed by kernel 130. For example, kernel 130 may include functionality to initialize, run, and/or terminate applications 142-144, as well as one or more processes used to execute applications 142-144.

As shown in FIG. 1B, applications 142-144 may be monitored by introspection modules 138-140. Like introspection module 120 of FIG. 1A, introspection modules 138-140 may be used to assess the integrity of software components within computing system 102. More specifically, introspection modules 138-140 may be used to assess the integrity of applications 142-144 executing within runtime environments 134-136 managed by kernel 130. For example, introspection module 138 may be used to monitor and analyze the execution of a Java (Java™ is a registered trademark of Sun Microsystems, Inc.) application 142 within Java runtime environments on computing system 102. On the other hand, introspection module 140 may be used to assess the integrity of a native application 144 on computing system 102.

As with introspection modules for operating systems, introspection modules 138-140 may be used to monitor applications in computing system 102 in a variety of ways. For example, one application may be monitored by one introspection module. Alternatively, if the application is large and/or complex, the application may be monitored and analyzed by a set of introspection modules. The set of introspection modules may further be used to monitor identical instances of the application within computing system 102, or each instance of the application may be monitored by separate instances of the introspection modules.

As with introspection module 120 in FIG. 1A, introspection modules 138-140 may be based on source code for applications 142-144. For example, introspection module 138 may be written by an engineer and/or architect of application 142. Introspection module 138 may also be released with application 142 to allow application 142 to be tested, debugged, and/or analyzed for attacks during execution. In addition, the independent execution of introspection modules 138-140 from applications 142-144 may allow introspection modules 138-140 to remain free of contamination from attacks and/or bugs in applications 142-144, and to detect such contamination in applications 142-144.

Introspection modules 138-140 may thus be used to enhance security for applications 142-144 by detecting exploits in applications 142-144 and/or enabling responses to detected exploits. For example, introspection modules 138-140 may include functionality to monitor and analyze applications 142-144 in a variety of ways through kernel 130, including observing information obtained from the execution of applications 142-144 (e.g., memory, system calls, variable domain ranges, network packets, code modules, data structures, events, etc.), suspending the execution of applications 142-144, applying instrumentation to applications 142-144, and/or modifying the execution of applications 142-144.

In one or more embodiments, introspection modules 138-140 of FIG. 1B are used to monitor software components executing at a different level of abstraction from that of introspection module 120 in FIG. 1A. While computing system 102 in FIG. 1A may be configured to execute operating systems within virtualized hardware environments (e.g., virtual machines), computing system 102 of FIG. 1B may be configured to execute applications 142-144 within virtualized process abstraction environments, virtualized operating system platforms, dynamic language runtime abstraction environments, and/or other virtualized runtime environments 134-136 for applications.

Furthermore, the configuration of FIG. 1B may execute entirely within one or more components of FIG. 1A. For example, kernel 130, introspection modules 138-140, and/or runtime environments 134-136 may execute within a guest domain (e.g., guest domains 114-116) of FIG. 1A. Consequently, multiple sets of applications, operating systems, virtual machines, and/or introspection modules may be nested within one another to the extent that hardware on computing system 102 is able to support such nesting. Introspection of other software components on computing system 102 may also occur outside the levels of abstraction provided by hypervisors and/or operating system kernels. For example, software drivers for hardware components of computing system 102 may be analyzed by introspection modules executing alongside and/or within hypervisor 106. In other words, the configurations of FIGS. 1A-1B may facilitate the execution of software components running within different platforms, virtualization environments, and/or levels of abstraction within computing system 102.

Figure 2:
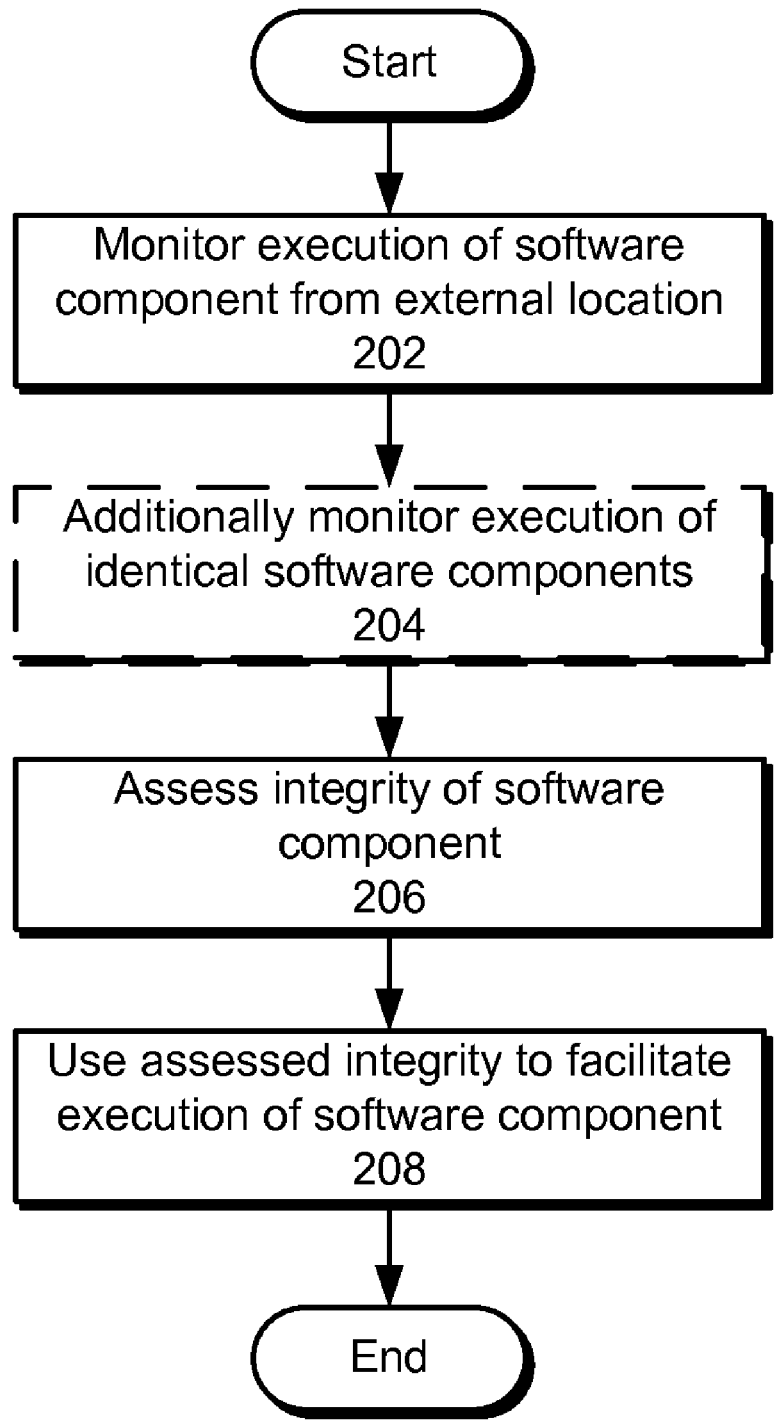
FIG. 2 shows a flowchart illustrating the process of managing execution of a software component in a virtualized environment in accordance with an embodiment.

FIG. 2 shows a flowchart illustrating the process of managing execution of a software component in a virtualized environment in accordance with an embodiment. In one or more embodiments, one or more of the steps may be omitted, repeated, and/or performed in a different order. Accordingly, the specific arrangement of steps shown in FIG. 2 should not be construed as limiting the scope of the embodiments.

Initially, the execution of the software component is monitored from an external location to the software component (operation 202). The monitoring may take place periodically (e.g., every few seconds), randomly, and/or upon detecting an event (e.g., hardware event, I/O event, network-based event, etc.) associated with the software component. As described above, the software component may refer to any software module executing within a computing system, such as an operating system, an application, and/or a driver. Moreover, the software component may execute within a virtualized runtime environment. For example, the software component may execute within a virtual machine, dynamic language runtime abstraction environment, virtualized process abstraction environment, and/or virtual operating system platform.

Optionally, the execution of identical software components to the software component may also be monitored (operation 204). The identical software components may correspond to software components that are identically installed, configured, and/or executed with the software component. For example, the software component may correspond to an operating system instance that executes alongside a number of other identical operating system instances within the same physical computing system (e.g., computing system 102 of FIGS. 1A-1B) and/or distributed across multiple computing systems (e.g., in a data center).

Next, the integrity of the software component is assessed (operation 206). In particular, the software component's integrity may be assessed by comparing the monitored execution of the software component to the expected operation of the component. The expected operation of the component may further be based on source code for the software component. For example, the expected operation of the software component may be determined by an engineer, designer, and/or architect of the software component. Consequently, the use of source code in assessing the software component's integrity may bridge the semantic gap between externally observed low-level information from the software component and high-level data structures and/or objects associated with the software component, even if the software component is closed source. Such low-level information may include memory pages, network packets, system calls, domain ranges of variables, code modules, data structures, hardware events, and/or input/output (I/O) events.

The assessed integrity of the software component may also be based on the additionally monitored execution of identical software components in operation 204. In other words, the integrity of the software component may further be assessed by comparing the monitored execution of the software component to the additionally monitored execution of any identical software components. Changes in the execution of the software component with respect to the execution of the identical software components may indicate the presence of an error, failure, bug, and/or exploit in the software component.

Finally, the assessed integrity is used to facilitate the execution of the software component (operation 208). Facilitating the execution of the software component may involve validating the execution of the software component for testing and/or release purposes, debugging the software component, and/or responding to an exploit of the software component detected in assessing the integrity of the software component. For example, the assessed integrity of the software component may be used to approve the release of the software component, suspend or alter the execution of the software component, and/or change the source code and/or subsequent execution of the software component.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for managing execution of a software component in a virtualized environment, comprising using at least one computer for:
   monitoring the execution of the software component from an external location to the virtualized environment, wherein the execution of the software component is monitored periodically, randomly, or upon detecting an event associated with the software component;
   assessing an integrity of the software component by comparing the monitored execution to an expected operation of the software component, wherein the expected operation is determined based on source code for the software component; and
   using the assessed integrity of the software component to facilitate the execution of the software component.

2. The computer-implemented method of claim 1, further comprising:
   additionally monitoring execution of an identical software component to the software component from the external location; and
   further assessing the integrity of the software component by comparing the monitored execution of the software component to the additionally monitored execution of the identical software component.

3. The computer-implemented method of claim 1, wherein facilitating the execution of the software component involves at least one of:
   validating the execution of the software component;
   debugging the software component; and
   responding to an exploit of the software component.

4. The computer-implemented method of claim 1, wherein assessing the integrity of the software component involves at least one of:
   detecting a deviation of the monitored execution from the expected operation of the software component; and determining a source of the deviation from the expected operation.

5. The computer-implemented method of claim 1, wherein the software component is closed source.

6. The computer-implemented method of claim 1, wherein the software component is at least one of an operating system and an application.

7. The computer-implemented method of claim 6, wherein the execution of the operating system is monitored through a hypervisor that executes the operating system in a virtual machine.

8. The computer-implemented method of claim 6, wherein the execution of the application is monitored through a kernel that executes the application in the virtualized environment.

9. The computer-implemented method of claim 1, wherein monitoring the execution of the software component involves monitoring at least one of:
   memory pages;
   network packets;
   system calls;
   domain ranges of variables;
   code modules;
   data structures;
   hardware events; and
   input/output (I/O) events.

10. A system for managing an execution of a virtual machine, comprising:
    a processor; and
    a hypervisor configured to execute the virtual machine and one or more introspection modules external to the virtual machine,
    wherein the one or more introspection modules are configured to:
    monitor the execution of the virtual machine, wherein the execution of the virtual machine is monitored periodically, randomly, or upon detecting an event associated with the virtual machine; and
    assess an integrity of the virtual machine by comparing the monitored execution to an expected operation of the virtual machine, wherein the expected operation is determined based on source code for the virtual machine.

11. The system of claim 10,
    wherein the hypervisor is further configured to execute a set of identical virtual machines to the virtual machine, and
    wherein the one or more introspection modules are further configured to:
    additionally monitor execution of each of the identical virtual machines; and
    further assess the integrity of the virtual machine by comparing the monitored execution of the virtual machine to the additionally monitored execution of the identical virtual machines.

12. The system of claim 10, wherein the assessed integrity of the virtual machine is used to facilitate the execution of the virtual machine by:
    validating the execution of the virtual machine;
    debugging the virtual machine; and
    responding to an exploit of the virtual machine.

13. The system of claim 10, wherein assessing the integrity of the virtual machine involves at least one of:
    detecting a deviation of the monitored execution from the expected operation of the virtual machine; and
    determining a source of the deviation from the expected operation.

14. The system of claim 10, wherein the virtual machine comprises a closed source operating system.

15. The system of claim 10, wherein monitoring the execution of the virtual machine involves monitoring at least one of:
    memory pages;
    network packets;
    system calls;
    domain ranges of variables;
    code modules;
    data structures;
    hardware events; and
    input/output (I/O) events.

16. A system for managing an execution of an application in a virtualized environment, comprising:
    a processor;
    a kernel configured to execute the application and one or more introspection modules external to the virtualized environment,
    wherein the one or more introspection modules are configured to:
    monitor the execution of the application, wherein the execution of the application is monitored periodically, randomly, or upon detecting an event associated with the application; and
    assess an integrity of the application by comparing the monitored execution to an expected operation of the application, wherein the expected operation is determined based on source code for the application,
    wherein the assessed integrity of the application is used to enhance security for the application.

17. The system of claim 16, wherein assessing the integrity of the application involves at least one of:
    detecting a deviation of the monitored execution from the expected operation of the application; and
    determining a source of the deviation from the expected operation.

18. The system of claim 17, wherein enhancing security for the application involves responding to an exploit corresponding to the source of the deviation.

* * * * *